United States Patent
Garcia

(10) Patent No.: US 7,350,117 B2
(45) Date of Patent: Mar. 25, 2008

(54) MANAGEMENT OF MICROCODE LOCK IN A SHARED COMPUTING RESOURCE

(75) Inventor: Enrique Garcia, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 10/959,286

(22) Filed: Oct. 5, 2004

(65) Prior Publication Data

US 2006/0075061 A1  Apr. 6, 2006

(51) Int. Cl.
*G06F 11/00* (2006.01)
(52) U.S. Cl. .......................................... 714/55; 718/104
(58) Field of Classification Search .................. 714/55; 710/244
See application file for complete search history.

(56) References Cited

U.S. PATENT DOCUMENTS

| | | | | |
|---|---|---|---|---|
| 5,377,352 A * | 12/1994 | Tanaka et al. | ............... | 718/103 |
| 5,862,353 A * | 1/1999 | Revilla et al. | ............... | 710/107 |
| 5,892,954 A * | 4/1999 | Tomas et al. | ............... | 710/200 |
| 6,473,849 B1 * | 10/2002 | Keller et al. | ................... | 712/30 |
| 6,543,002 B1 * | 4/2003 | Kahle et al. | ................... | 714/10 |
| 6,609,178 B1 * | 8/2003 | Ofer | ............................ | 711/152 |
| 6,757,769 B1 * | 6/2004 | Ofer | ............................ | 710/200 |
| 7,174,406 B1 * | 2/2007 | Abdallah et al. | ............ | 710/240 |
| 2003/0126381 A1 * | 7/2003 | Vo | ............................... | 711/152 |
| 2004/0210738 A1 * | 10/2004 | Kato et al. | ...................... | 712/1 |
| 2006/0107284 A1 * | 5/2006 | Crawford et al. | .............. | 725/25 |

OTHER PUBLICATIONS

IEEE 100, The Authoritative Dictionary of IEEE Standards Terms, 7th Ed. 2000. pp. 509, 1184.*

* cited by examiner

*Primary Examiner*—Christopher McCarthy
(74) *Attorney, Agent, or Firm*—Dan Shifrin

(57) ABSTRACT

In a power controller or other computing resource shared by multiple processors, an ID is written to the lock register, thereby designating a master processor. A timer is then initialized to count for a predetermined period. Periodically, the master processor transmits a "heartbeat" signal to the shared resource, indicating that its operation remains normal. Upon receipt of the heartbeat signal, the timer is reset and begins a new count for the predetermined period. If the timer reaches the end of the period without having received a heartbeat signal, indicating that the master processor has failed or hung, the lock register is cleared again and an interrupt signal is broadcast to all of the processors. The processors compete for master status anew and, when an ID is successfully written to the lock register, the timer is restarted and the new master periodically transmits its heartbeat signal.

7 Claims, 2 Drawing Sheets

MANAGEMENT OF MICROCODE LOCK IN A SHARED COMPUTING RESOURCE

TECHNICAL FIELD

The present invention relates generally to computing systems with shared resources and, in particular, to the management of a microcode lock within a shared resource.

BACKGROUND ART

In a large scale computing environment, such as one in which one or more storage subsystems are attached to one or more host devices, some computing resources are shared by various components. For example, a storage subsystem may include one or more storage controllers, each having two clusters, each cluster having up to 16 logical storage partitions. A single power controller may be shared among many (or all) of the partitions. The power controller provides power system management for the attached clusters as well as other functions which are common to the clusters and partitions.

Typically, the power controller requires that one of the attached partitions provide processing operations. The conventional process by which a partition is selected is as generally follows. The power controller includes a microcode lock register to store the address or other ID of the selected master partition. At power-on, a reset or other similar event, the contents of the register are initialized to 0. Thereupon, each attached partition attempts to write its respective ID to the lock register. To determine the "winner", each partition reads back the contents of the register. If a particular partition reads back its own ID, that partition begins to serve as the master while the other partitions continue their normal operations.

Occasionally, a master partition will fail, hang or attempt to relinquish its status as master. There is currently no procedure to establish a new master in such circumstances.

SUMMARY OF THE INVENTION

The present invention provides management for a computing resource, such as a power controller, which is shared by multiple processing units, such as logical storage controllers. The management system includes a lock register and a timing device. Initially, an ID is written to the lock register by one of the processors, replacing the cleared status of the register and thereby designating that processor as the master processor. The timer is then initialized to count for a predetermined period. Periodically, the master processor transmits a "heartbeat" signal to the shared resource, indicating that its operation remains normal. Upon receipt of the heartbeat signal, the timer is reset and begins a new count for the predetermined period. If the timer reaches the end of the period without having received a heartbeat signal, indicating that the master processor has failed, hung or is relinquishing control, the lock register is cleared again and an interrupt signal is broadcast to all of the processors. The processors compete for master status anew and, when an ID is successfully written to the lock register, the timer is restarted and the new master periodically transmits its heartbeat signal. An arbiter/controller may be employed as an interface between the processors and the lock register and to start, stop and reset the timer. An interrupt generator may be employed to send the interrupt signal to the processors when triggered if the timer reaches the end of the predetermined period.

DETAILED DESCRIPTION OF THE PREFERRED EMBODIMENT

Although the present invention will be described herein in the context of a power controller and attached partitions, the invention is applicable to other systems and components. Consequently, the power controller may be referred to herein generally as a "shared computing resource" (or simply "resource") and the partitions may be referred to herein generally as "processors".

Figure 1:
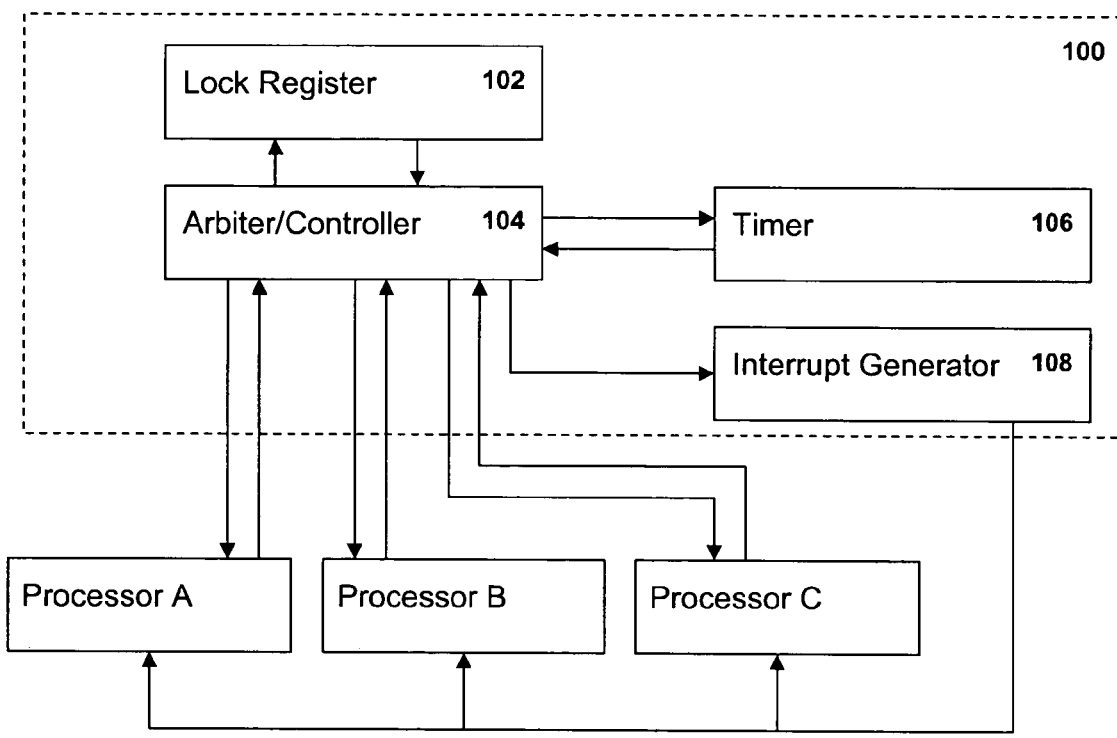
FIG. 1 is a block diagram of an embodiment of the present invention.

FIG. 1 is a block diagram of a portion of a shared computing resource in which the lock manager 100 of the present invention may be implemented. Attached to the resource 100, are multiple processors, three of which are shown in FIG. 1 and designated as A, B and C (the three processors A, B and C are representative of any number of processors; it will be appreciated that fewer than or more than three may be attached). The resource 100 includes a microcode lock register 102 in which is stored the address or other ID of the processor designated as the master processor. The resource 100 also includes an arbiter/controller 104, a timer 106 and an interrupt generator 108. The arbiter/controller 104 may include a processor and a memory. Instructions may be stored in the memory and executed by the processor to effect the method of the present invention. The functions of the timer 106 and the interrupt generator 108 may be performed by any appropriate device, including the arbiter/controller 104. However, for clarity, the timer 106 and the interrupt generator 108 will be described as separate devices. The timer 106 may be an incrementing counter or a decrementing counter and may be clocked or operate at selective predetermined intervals.

Figure 2:
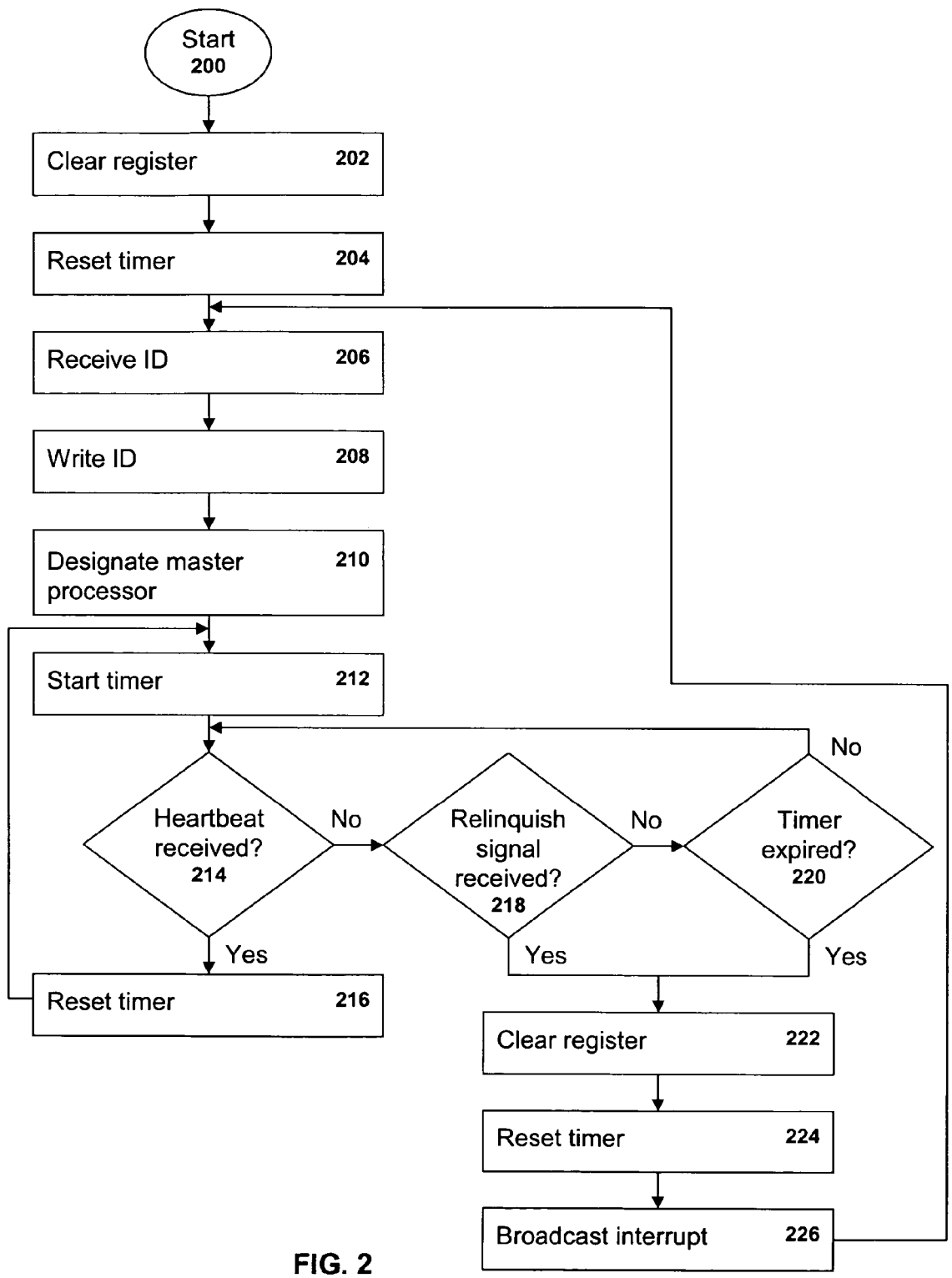
FIG. 2 is a flow chart of the process of the present invention.

Referring also to the flow chart of FIG. 2, upon an initial power-on or reset (step 200), the arbiter/controller 104 clears the contents of the lock register 102 to a predetermined value, such as all zeros (step 202). The arbiter/controller 104 also stops the timer 106 if it is running and resets its time to a predetermined period (step 204). The processors A, B and C each attempt to write their respective ID to the lock register 102 (step 206). The processor which succeeds in writing its ID to the lock register 102 (step 208) is designated as the master processor (step 210) and the timer commences counting (step 212).

At regular, predetermined intervals, the master processor transmits a "heartbeat signal" to the arbiter/controller 104 which indicates that the master processor is operating properly. When the arbiter/controller 104 receives a heartbeat signal (step 214), it resets (step 216) and restarts (step 212) the timer 106.

If the arbiter/controller 104 does not receive a heartbeat signal, it checks to determine if the master processor has transmitted a relinquish signal (step 218), indicating that the master processor is attempting to relinquish its status as master. If such a signal has not been received, the arbiter/controller 104 determines if the timing period has expired (step 220). If not, the arbiter/controller 104 continues to listen for a heartbeat signal, a relinquish signal or a signal from the timer indicating that the period has expired.

If, on the other hand, if the timer has expired (step 220), indicating that the master processor has failed or hung, or if a relinquish signal is received (step 218), the lock register is cleared (step 222) and the timer is reset (step 224). An interrupt signal is also broadcast by the interrupt generator 108 (step 226) to the processors A, B and C whereupon the processors A, B and C attempt again to have their respective IDs written into the lock register 102 and the entire process repeats with a new (or the same) master processor.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for managing a microcode lock in a shared computing resource, comprising:
   clearing contents of a lock register in a shared computing resource comprising a power controller;
   receiving an ID from a first of a plurality of processors comprising logical partitions within one or more storage controllers sharing the power controller;
   writing the ID from the first processor into the lock register;
   starting a timer to count for a predetermined period;
   listening for a heartbeat signal from the first processor indicating that operation of the first processor remains normal;
   restarting the timer to count for the predetermined period if the heartbeat signal is received from the first processor before the expiration of the predetermined period; and
   if a heartbeat signal is not received from the first processor before the expiration of the predetermined period:
      clearing the contents of the lock register; and
      broadcasting an interrupt signal to the plurality of processors.

2. The method of claim 1, further comprising, following the broadcasting the interrupt signal:
   receiving an ID from a second of the plurality of processors;
   writing the ID from the second processor into the lock register; and
   restarting the timer to count for the predetermined period.

3. An apparatus for managing a microcode lock in a shared computing resource, comprising:
   a lock register in a shared computing resource comprising a power controller;
   a timer;
   an arbiter/controller in the shared computing resource adapted to:
      prioritize simultaneous accesses to the shared computing resource from a plurality of attached processors comprising logical partitions within one or more storage controllers;
      determine contents of the lock register; and
      reset, start and stop the timer;
      clear the contents of the lock register;
      broadcast a signal to the plurality of processors indicating that the contents of the lock register are clear;
      receive an ID from a first of the plurality of processors;
      write the ID from the first processor into the lock register;
      start the timer to count for a predetermined time;
      listen for a heartbeat signal from the first processor indicating that operation of the first processor remains normal;
      restart the timer to count for the predetermined period if the heartbeat signal is received from the first processor before the expiration of the predetermined period; and
      if a heartbeat signal is not received from the first processor before the expiration of the predetermined period:
         clear the contents of the lock register; and
         broadcast an interrupt signal to the plurality of processors.

4. The apparatus of claim 3, the arbiter/controller further adapted to, following the broadcasting the interrupt signal:
   receive an ID from a second of the plurality of processors;
   write the ID from the second processor into the lock register; and
   restart the timer to count for the predetermined period.

5. The apparatus of claim 3, further comprising an interrupt generator adapted to broadcast the interrupt signal to the plurality of processors upon the expiration of the timing period.

6. A computer program product of a computer readable medium usable with a programmable computer, the computer program product having computer-readable code embodied therein for managing a microcode lock in a shared computing resource, the computer-readable code comprising instructions for:
   clearing contents of a lock register in a shared computing resource comprising a power controller;
   receiving an ID from a first of a plurality of processors comprising logical partitions within one or more storage controllers sharing the computing resource;
   writing the ID from the first processor into the lock register;
   starting a timer to count for a predetermined period;
   listening for a heartbeat signal from the first processor indicating that operation of the first processor remains normal;
   restarting the timer to count for the predetermined period if the heartbeat signal is received from the first processor before the expiration of the predetermined period; and
   if a heartbeat signal is not received from the first processor before the expiration of the predetermined period:
      clearing the contents of the lock register;
      broadcasting an interrupt signal to the plurality of processors.

7. The computer program product of claim 6, further comprising instructions for, following the broadcasting the interrupt signal:
   receiving an ID from a second of the plurality of processors;
   writing the ID from the second processor into the lock register; and
   restarting the timer to count for the predetermined period.

* * * * *